US012665718B2

(12) United States Patent
Frenne et al.

(10) Patent No.: US 12,665,718 B2
(45) Date of Patent: Jun. 23, 2026

(54) METHOD AND APPARATUS FOR CONTROLLING USE OF TRACKING REFERENCE SIGNALS BY USER EQUIPMENTS IN A WIRELESS COMMUNICATION NETWORK

(71) Applicant: Telefonaktiebolaget LM Ericsson (publ), Stockholm (SE)

(72) Inventors: Mattias Frenne, Uppsala (SE); George Jöngren, Sundbyberg (SE); Siva Muruganathan, Stittsville (CA); Shiwei Gao, Nepean (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 299 days.

(21) Appl. No.: 18/257,902

(22) PCT Filed: Dec. 15, 2021

(86) PCT No.: PCT/EP2021/085829
§ 371 (c)(1),
(2) Date: Jun. 16, 2023

(87) PCT Pub. No.: WO2022/129128
PCT Pub. Date: Jun. 23, 2022

(65) Prior Publication Data
US 2024/0056256 A1    Feb. 15, 2024

Related U.S. Application Data

(60) Provisional application No. 63/126,714, filed on Dec. 17, 2020.

(51) Int. Cl.
*H04L 5/00* (2006.01)
*H04W 72/1273* (2023.01)
*H04W 72/23* (2023.01)

(52) U.S. Cl.
CPC ....... *H04L 5/0051* (2013.01); *H04W 72/1273* (2013.01); *H04W 72/23* (2023.01)

(58) Field of Classification Search
CPC ........................ H04L 5/0051; H04W 72/1273; H04W 72/23; H04W 56/00; H04W 88/085
See application file for complete search history.

(56) References Cited

U.S. PATENT DOCUMENTS 10,425,264 B2 *  9/2019  Ko ...................... H04L 27/2662
2017/0317794 A1 *  11/2017  You ........................ H04L 5/0051
(Continued)

FOREIGN PATENT DOCUMENTS

CA          2865770  A1    10/2013
WO      2019195171  A1    10/2019

OTHER PUBLICATIONS

3GPP, "3rd Generation Partnership Project; Technical Specification Group Radio Access Network; NR; Physical layer procedures for data (Release 15)", 3GPP TS 38.214 V15.4.0, Dec. 2018, 1-102.

*Primary Examiner* — Habte Mered
(74) *Attorney, Agent, or Firm* — Murphy, Bilak & Homiller, PLLC

(57)          ABSTRACT

Techniques disclosed herein provide for prohibiting use by a User Equipment (UE) (12) of configured Tracking Reference Signals (TRSs) (30). For example, under certain conditions or circumstances, the UE (12) is prohibited from using any configured TRS (30) for time or frequency tracking, for reception by the UE (12) of a physical downlink channel (32). For example, when TRS usage is prohibited for time or frequency tracking for reception of a physical downlink channel (32), the UE (12) uses Demodulation Reference Symbols (DMRS) transmitted for the physical downlink channel (32), for such time or frequency tracking.

20 Claims, 8 Drawing Sheets

(56) References Cited

U.S. PATENT DOCUMENTS

| | | | |
|---|---|---|---|
| 2019/0166615 A1 | 5/2019 | Nimbalker et al. | |
| 2019/0357159 A1* | 11/2019 | Pan | H04L 5/0051 |
| 2020/0059874 A1* | 2/2020 | Noh | H04L 5/0051 |
| 2022/0173862 A1* | 6/2022 | Venugopal | H04B 7/06968 |
| 2022/0322231 A1* | 10/2022 | Sun | H04W 52/0229 |
| 2023/0130150 A1* | 4/2023 | Shahmohammadian | H04L 5/0053 |
| | | | 370/329 |

* cited by examiner

ONE SLOT (14 SYMBOLS)

PDCH (DATA)

CONTROL (PDCCH), POSSIBLY DATA

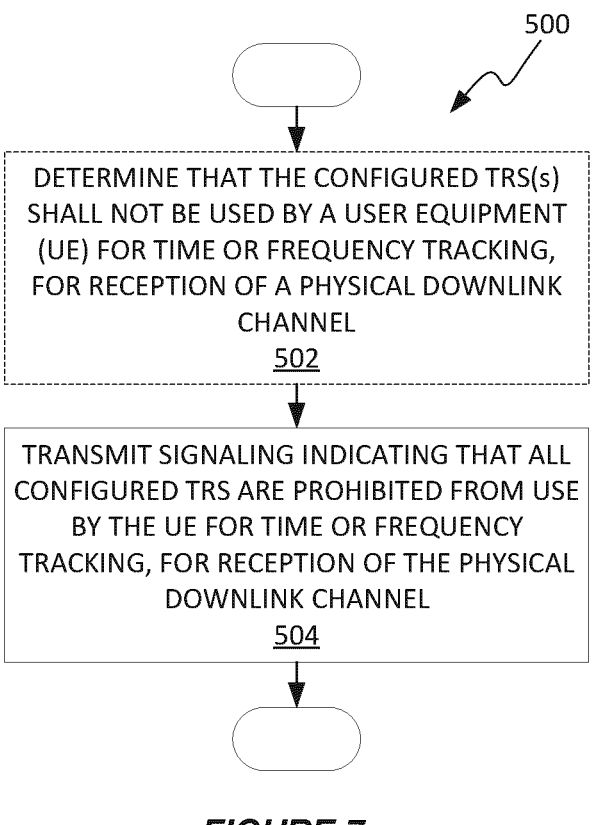

500

DETERMINE THAT THE CONFIGURED TRS(s)
SHALL NOT BE USED BY A USER EQUIPMENT
(UE) FOR TIME OR FREQUENCY TRACKING,
FOR RECEPTION OF A PHYSICAL DOWNLINK
CHANNEL
502

TRANSMIT SIGNALING INDICATING THAT ALL
CONFIGURED TRS ARE PROHIBITED FROM USE
BY THE UE FOR TIME OR FREQUENCY
TRACKING, FOR RECEPTION OF THE PHYSICAL
DOWNLINK CHANNEL
504

*FIGURE 7*

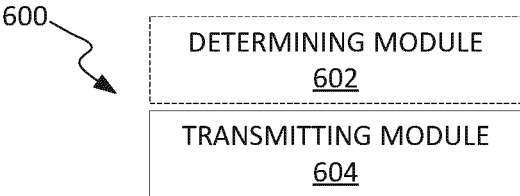

600

DETERMINING MODULE
602

TRANSMITTING MODULE
604

*FIGURE 8*

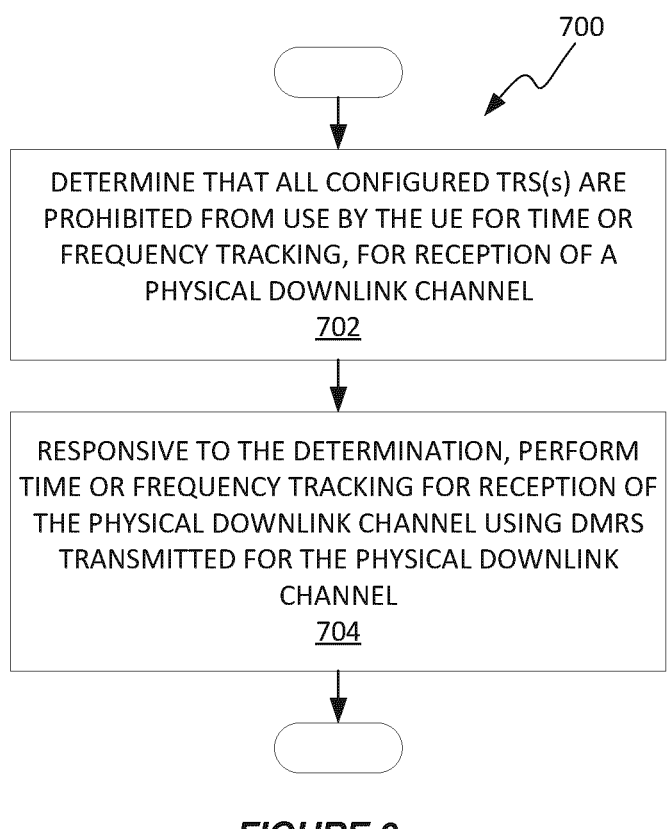

700

DETERMINE THAT ALL CONFIGURED TRS(s) ARE PROHIBITED FROM USE BY THE UE FOR TIME OR FREQUENCY TRACKING, FOR RECEPTION OF A PHYSICAL DOWNLINK CHANNEL
702

RESPONSIVE TO THE DETERMINATION, PERFORM TIME OR FREQUENCY TRACKING FOR RECEPTION OF THE PHYSICAL DOWNLINK CHANNEL USING DMRS TRANSMITTED FOR THE PHYSICAL DOWNLINK CHANNEL
704

*FIGURE 9*

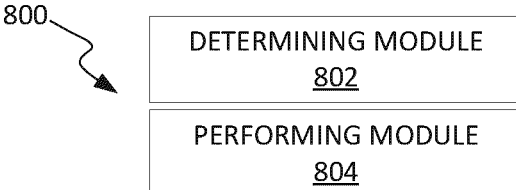

800

DETERMINING MODULE
802

PERFORMING MODULE
804

*FIGURE 10*

METHOD AND APPARATUS FOR CONTROLLING USE OF TRACKING REFERENCE SIGNALS BY USER EQUIPMENTS IN A WIRELESS COMMUNICATION NETWORK

TECHNICAL FIELD

This disclosure relates to wireless communication networks and specifically, controlling the use tracking reference signals by User Equipments (UEs) in such networks.

BACKGROUND

The new generation mobile wireless communication system (5G) or new radio (NR) supports a diverse set of use cases and a diverse set of deployment scenarios.

NR uses CP-OFDM (Cyclic Prefix Orthogonal Frequency Division Multiplexing) in the downlink (i.e., from a network node, gNB, eNB, or base station, to a user equipment or UE) and both CP-OFDM and DFT-spread OFDM (DFT-S-OFDM) in the uplink (i.e., from UE to gNB). In the time domain, NR downlink and uplink physical resources are organized into equally-sized subframes of 1 ms each. A subframe is further divided into multiple slots of equal duration.

The slot length depends on subcarrier spacing. For subcarrier spacing of $\Delta f=15$ kHz, there is only one slot per subframe, and each slot always consists of 14 OFDM symbols, irrespectively of the subcarrier spacing.

Typical data scheduling in NR are per slot basis, where the first two symbols contain physical downlink control channel (PDCCH) and the remaining 12 symbols contains physical data channel (PDCH), either a PDSCH (physical downlink data channel) or PUSCH (physical uplink data channel). The example illustrated in FIG. 1 depicts the NR time-domain structure with a 15 kHz subcarrier spacing. Different subcarrier spacing values are supported in NR. The supported subcarrier spacing values (also referred to as different numerologies) are given by $\Delta f=(15 \times 2^\alpha)$ kHz where $\alpha$ is a non-negative integer. $\Delta f=15$ kHz is the basic subcarrier spacing that is also used in LTE. The slot durations at different subcarrier spacings are shown in the table immediately below.

| Numerology | Slot length | RB BW |
| --- | --- | --- |
| 15 kHz | 1 ms | 180 kHz |
| 30 kHz | 0.5 ms | 360 kHz |
| 60 kHz | 0.25 ms | 720 kHz |
| 120 kHz | 125 μs | 1.44 MHz |
| 240 kHz | 62.5 μs | 2.88 MHz |

In the frequency domain physical resource definition, a system bandwidth is divided into resource blocks (RBs), each corresponds to 12 contiguous subcarriers. The common RBs (CRB) are numbered starting with 0 from one end of the system bandwidth. The UE is configured with one or up to four bandwidth parts (BWPs) which may be a subset of the RBs supported on a carrier. Hence, a BWP may start at a CRB larger than zero. All configured BWPs have a common reference, the CRB 0. Hence, a UE can be configured a narrow BWP (e.g., 10 MHz) and a wide BWP (e.g. 100 MHz), but only one BWP can be active for the UE at a given point in time. The physical RB (PRB) are numbered from 0 to N−1 within a BWP (but the 0:th PRB may thus be the K:th CRB where K>0).

The basic NR physical time-frequency resource grid is illustrated in FIG. 2, with only one resource block (RB) within a 14-symbol slot shown.

Downlink transmissions can be dynamically scheduled, i.e., in each slot the gNB transmits downlink control information (DCI) over PDCCH about which UE data is to be transmitted to and which RBs in the current downlink slot the data is transmitted on. PDCCH is typically transmitted in the first one or two OFDM symbols in each slot in NR. The UE data are carried on PDSCH. A UE first detects and decodes PDCCH and the decoding is successfully, it then decodes the corresponding PDSCH based on the decoded control information in the PDCCH.

Uplink data transmission can also be dynamically scheduled using PDCCH. Similar to downlink, a UE first decodes uplink grants in PDCCH and then transmits data over PUSCH based the decoded control information in the uplink grant such as modulation order, coding rate, uplink resource allocation, etc.

Quasi Co-Located (QCL) and Transmission Configuration Information (TCI) States

Several signals can be transmitted from the same base station antenna from different antenna ports. These signals can have the same large-scale properties, for instance in terms of Doppler shift/spread, average delay spread, or average delay, when measured at the receiver. These antenna ports are then said to be QCL.

The network can then signal to the UE that two antenna ports are QCL. If the UE knows that two antenna ports are QCL with respect to a certain parameter (e.g., Doppler spread), the UE can estimate that parameter based on a reference signal transmitted on one of the antenna ports and use that estimate when receiving another reference signal or physical channel on the other antenna port. Typically, the first antenna port is represented by a measurement reference signal such as Channel State Information (CSI) Reference Signal (RS) (known as source RS) and the second antenna port is a demodulation reference signal (DMRS) (known as target RS) for PDSCH or PDCCH reception.

For instance, if antenna ports A and B are QCL with respect to average delay, the UE can estimate the average delay from the signal received from antenna port A (known as the source reference signal (RS)) and assume that the signal received from antenna port B (target RS) has the same average delay. This is useful for demodulation, because the UE can know beforehand the properties of the channel when trying to measure the channel utilizing the DMRS, which may help the UE in for instance selecting an appropriate channel estimation filter.

Information about what assumptions can be made regarding QCL is signaled to the UE from the network. In NR, four types of QCL relations/information between a transmitted source RS and transmitted target RS are defined:

Type A: {Doppler shift, Doppler spread, average delay, delay spread}

Type B: {Doppler shift, Doppler spread}

Type C: {average delay, Doppler shift}

Type D: {Spatial Rx parameter}

Information of QCL type D was introduced to facilitate beam management with analog beamforming and is known as spatial QCL. There is currently no strict definition of spatial QCL, but the understanding is that if two transmitted antenna ports are spatially QCL, the UE can use the same Rx beam to receive them. This is helpful for a UE that use analog beamforming to receive signals, since the UE need to adjust its RX beam in some direction prior to receiving a certain signal. If the UE knows that the signal is spatially QCL with some other signal it has received earlier, then it can safely use the same RX beam to receive the signal. Note that for beam management, the discussion mostly revolves around QCL Type D, but it is also necessary to convey a Type A QCL relation for the RSs to the UE, so that it can estimate all the relevant large-scale parameters.

Typically, this is achieved by configuring the UE by radio resource configuration (RRC) signaling with a CSI-RS for tracking (TRS) for time/frequency offset estimation. Using a TRS for time or frequency tracking means using the TRS to synchronize the timing of the UE to the timing—e.g., the radio signal timing—of the TRS and/or correct radiofrequency errors at the UE, using the TRS as the reference frequency. To be able to use any QCL reference, the UE would have to receive it with a sufficiently good SINR. In many cases, this means that the TRS has to be transmitted in a suitable beam to a certain UE.

To introduce dynamics in beam and transmission point (TRP) selection, the UE can be configured through RRC signaling with M TCI states, where M is an integer up to 128 in frequency range 2 (FR2) for the purpose of PDSCH reception. M is an integer up to 8 in FR1, depending on UE capability.

Each TCI state contains QCL information, i.e., one or two source DL RSs, each source RS associated with a QCL type. For example, a TCI state contains a pair of reference signals, each associated with a QCL type, e-g—two different CSI-RSs {CSI-RS1, CSI-RS2} is configured in the TCI state as {qcl-Type1,qcl-Type2}={Type A, Type D}. It means the UE can derive Doppler shift, Doppler spread, average delay, delay spread from CSI-RS1 and Spatial Rx parameter (i.e., the RX beam to use) from CSI-RS2.

Each of the M states in the list of TCI states can be interpreted as a list of M possible beams transmitted from the network or a list of M possible Transmission/Reception Points (TRPs) used by the network to communicate with the UE. The M TCI states can also be interpreted as a combination of one or multiple beams transmitted from one or multiple TRPs.

A first list of available TCI states is configured for PDSCH, and a second list of TCI states is configured for PDCCH. Each TCI state contains a pointer, known as TCI State ID, which points to the TCI state. The network then activates via MAC CE one TCI state for PDCCH (i.e., provides a TCI for PDCCH) and up to eight active TCI states for PDSCH. The number of active TCI states the UE support is a UE capability, but the maximum is eight.

Each configured TCI state contains parameters for the QCL associations between source reference signals (CSI-RS or Synchronization Signal (SS)/Physical Broadcast Channel (PBCH) and target reference signals (e.g., PDSCH/PDCCH DMRS ports). TCI states are also used to convey QCL information for the reception of CSI-RS.

Assume a UE is configured with four active TCI states (from a list of totally 64 configured TCI states). Hence, 60 TCI states are inactive for this particular UE (but some may be active for another UE) and the UE need not be prepared to have large scale parameters estimated for those. But the UE continuously tracks and updates the large scale parameters for the four active TCI states by measurements and analysis of the source RSs indicated by each TCI state. When scheduling a PDSCH to a UE, the DCI contains a pointer to one active TCI. The UE then knows which large scale parameter estimate to use when performing PDSCH DMRS channel estimation and thus PDSCH demodulation. NR HARQ ACK/NACK Feedback Over PUCCH When receiving a PDSCH in the downlink from a serving gNB at slot n, a UE feeds back a HARQ ACK at slot n+k over a PUCCH (Physical Uplink Control Channel) resource in the uplink to the gNB if the PDSCH is decoded successfully, otherwise, the UE sends a HARQ ACK/NACK at slot n+k to the gNB to indicate that the PDSCH is not decoded successfully. If two transport blocks (TBs) are carried by the PDSCH, then a HARQ ACK/NACK is reported for each TB.

For DCI format 1_0, k is indicated by a 3-bit PDSCH-to-HARQ-timing-indicator field. For DCI formats 1_1 and 1_2, k is indicated either by a 0-3 bit PDSCH-to-HARQ-timing-indicator field, if present, or by higher layer configuration through Radio Resource Control (RRC) signaling. Separate RRC configuration of PDSCH to HARQ-Ack timing are used for DCI formats 1_1 and 1_2.

To configure and activate a TCI state, RRC and MAC CE signaling is needed. This has some drawbacks as the network need to use frequent signaling when the UE moves in the cell, to frequently update active TCI state(s). This leads to excessive MAC and RRC signaling.

SUMMARY

Techniques disclosed herein provide for prohibiting use by a User Equipment (UE) of configured Tracking Reference Signals (TRSs). For example, under certain conditions or circumstances, the UE is prohibited from using any configured TRS for time or frequency tracking, for reception by the UE of a physical downlink channel. For example, when TRS usage is prohibited for time or frequency tracking for reception of a physical downlink channel, the UE uses Demodulation Reference Symbols (DMRS) transmitted for the physical downlink channel, for such time or frequency tracking.

One embodiment comprises a method performed by a UE. The method includes the UE determining that all configured TRSs are prohibited from use by the UE for time or frequency tracking, for reception of a physical downlink channel transmitted by a transmission point (TP) of a wireless communication network. Responsive to the determining, the UE performs time or frequency tracking for reception of the downlink physical channel using DMRS transmitted for the physical downlink channel.

Another embodiment comprises a computer-readable medium storing computer program instructions that, when executed by processing circuitry of a UE, configure the UE to: determine that all configured TRSs are prohibited from use by the UE for time or frequency tracking, for reception of a physical downlink channel transmitted by a TP 24 of a wireless communication network; and responsive to the determining, perform time or frequency tracking for reception of the downlink physical channel using DMRS transmitted for the physical downlink channel.

Another embodiment comprises UE comprising communication circuitry that is configured for wireless communication with respect to a wireless communication network and processing circuitry that is operatively associated with the communication circuitry. The processing circuitry is configured to: determine that all configured TRSs are prohibited from use by the UE for time or frequency tracking, for reception of a physical downlink channel transmitted by a TP of a wireless communication network; and responsive to the determining, perform time or frequency tracking for reception of the downlink physical channel using DMRS transmitted for the physical downlink channel.

Another embodiment comprises a method performed by a network node in a wireless communication network. The method includes the network node transmitting signaling to a UE indicating that all configured TRSs are prohibited from use by the UE for time or frequency tracking, for reception of a physical downlink channel transmitted by a TP of the wireless communication network.

Another embodiment comprises a computer-readable medium storing computer program instructions that, when executed by processing circuitry of a network node configured for operation in a wireless communication network, configure the network node to: transmit signaling to a UE, indicating that all configured TRSs are prohibited from use by the UE for time or frequency tracking, for reception of a physical downlink channel transmitted by a TP of the wireless communication network.

Yet another embodiment comprises a network node configured for operation in a wireless communication network. The network node comprises communication circuitry that is configured to exchange signaling directly or indirectly with one or more UEs and processing circuitry that is operatively associated with the communication circuitry. The processing circuitry is configured to transmit signaling to a UE indicating that all configured TRSs are prohibited from use by the UE for time or frequency tracking, for reception of a physical downlink channel transmitted by a TP of the wireless communication network.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 7 is a block diagram of one embodiment of a method performed by a wireless communication device.

FIG. 8 is a block diagram of another embodiment of a wireless communication device.

FIG. 9 is a block diagram of one embodiment of a method performed by a network node.

FIG. 10 is a block diagram of another embodiment of a network node.

DETAILED DESCRIPTION

Figure 1:
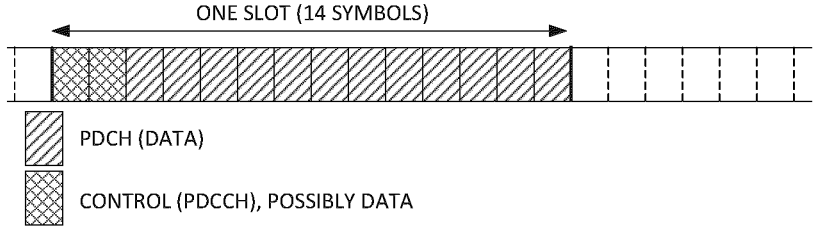
FIG. 1 is a diagram of the time-domain structure signal for New Radio (NR), with a 15 kHz subcarrier spacing.
Figure 2:
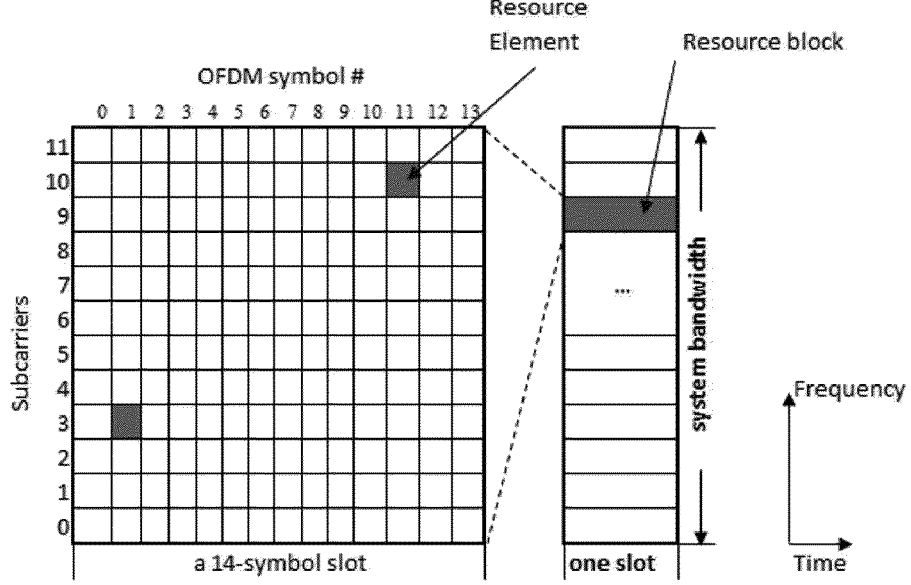
FIG. 2. is a diagram of the basic time-frequency resource grid in NR.

One aspect of the techniques disclosed herein is that the QCL association between PDSCH DMRS and the periodic TRS or periodic SSB can be enabled or disabled based on some criteria or some signaling from a wireless communication network to a wireless communication device. Hence, using the example of receiving a PDSCH, the wireless communication device receives the PDSCH in either of two modes: a first mode where the wireless device uses QCL assistance, and a second mode where the wireless device does not use QCL assistance, except perhaps for spatial assistance. The wireless communication device selects or uses the first or second mode in dependence on, e.g., signaling from the network or detecting whether one or more conditions are satisfied.

As an example, a wireless communication device receiving a physical downlink channel with QCL assistance means that the wireless communication device uses measurements on the QCL source signal—a TRS—to enhance the reception of DMRS transmitted for the physical downlink channel, which, in turn, enhances reception of the physical downlink channel. Receiving the physical downlink channel without QCL assistance means that the reception shall not rely on a periodic QCL source such as a periodic TRS. One example criterion for deciding whether to use QCL assistance or prohibit such use is the scheduled bandwidth of the physical downlink channel. Another criterion is the Modulation and Coding Scheme (MCS) used for the physical downlink channel. Another criterion is the number of resource blocks (RBs) allocated for the physical downlink channel. Another criterion is whether or how many DMRS (symbols) are transmitted with/in the physical downlink channel. Of course, in some embodiments, combinations of two or more such criteria are used.

The physical downlink channel is, for example, a PDSCH or a PDCCH. Although several examples in this disclosure discuss operation in the context of receiving a PDSCH, that context should not be understood as limiting. Indeed, the contemplated technique provides broad flexibility for the involved wireless communication network in terms of deployment and operation, as it allows the network to transmit a physical downlink channel for a wireless communication device with or without use of an associated, configured TRS.

As such, the Transmission Reception Point (TRP) used for transmitting a particular physical downlink channel for the wireless communication device need not transmit a TRS—e.g., a periodic TRS or SS/PCBH, for use by the device in receiving the physical downlink channel. Receiving a physical downlink channel without using a configured TRS may be referred to as "self-contained" reception, denoting that the wireless communication device performs both "fine tracking" and channel estimation using DMRS carried in the physical downlink channel. Here, "fine tracking" denotes timing synchronization and/or frequency compensation (e.g., frequency offset correction) by the wireless communication device, for reception of the physical downlink channel. Such flexibility allows the wireless communication device to transmit on a carrier without configuring periodic TRS or with reduced periodic TRS periodicity, which reduces overhead and interference. Especially in FR2, the TRS overhead can be excessive as one periodic TRS is needed per active transmission "beam."

Figure 3:
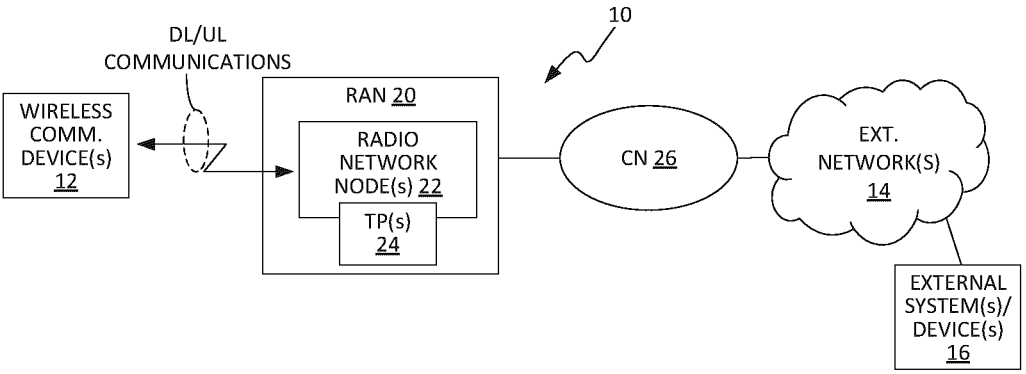
FIG. 3 is a block diagram of one embodiment of a wireless communication network.

FIG. 3 illustrates an example wireless communication network 10. By way of example, the network 10 is a Fifth Generation (5G) New Radio (NR) network or other Third Generation Partnership Project (3GPP) wireless communication network. For ease of illustration and discussion, only a limited number of entities (nodes, etc.) appear in the diagram, and it shall be understood that the network 10 may have additional instances of the entities that are illustrated and may include other entities that are not illustrated.

In the example depiction, the network 10 provides one or more types of communication services to wireless communication devices, also referred to as "wireless devices," "User Equipments," or "UEs." One wireless communication device 12 is shown for example purposes, and it may be a smartphone or other personal communication device, a laptop or other computer, a wireless network adaptor or other "embedded" UE, such as used for Machine Type Communication (MTC) applications in a Machine-to-Machine (M2M) context.

The wireless communication device 12 uses the network 10 as an "access" network for communicating with other devices or systems, such as coupling through the network 10 to the Internet or another external network 14, which provides access to one or more external systems or devices 16, such as application servers that provide one or more types of communication services.

A Radio Access Network (RAN) 20 of the network 10 includes one or more radio network nodes 22 that operate as or control one or more respective Transmission Points (TPs) 24. A TP 24 may also have receive capability and thus may operate as a Transmission Reception Point (TRP). In one example, a radio network node 22 is a gNB or other type of base station and includes an antenna array and thus operates as a TP 24 in the network 10. In another example, a radio network node 22 is a radio equipment controller that controls a distributed antenna system or one or more remote radio equipments (RRUs or "radio heads") that each operate as a TP 24.

In a particular but still non-limiting example, the RAN 20 includes one or more radio network nodes 22 operating as or controlling a plurality of TPs 24, where at least one TP 24 provides "macro" coverage, and one or more further TPs 24 provide small-cell or "femto" coverage that is overlapped by the macro coverage. In such an arrangement, the macro TP 24 may transmit/broadcast one or more TRSs usable by wireless communication devices 12 for time/frequency tracking of physical downlink channels transmitted by the macro TP 24 but may prohibit the use of all such TRSs by the wireless communication devices 12 for physical downlink channels transmitted by respective ones of the femto TPs 24. Such an arrangement allows the network 10 to transmit data to a particular wireless communication device 12 from a best-performing one of the femto TPs 24, at any given instant, without having to set up or otherwise transmit an associated TRS from that TP 24, for use by the targeted wireless communication device 12 in performing time/frequency tracking for reception of the data. Instead, the wireless communication device 12 is told, or otherwise deduces, that it is prohibited from using the configured TRS(s) for reception of the data and, consequently, the wireless communication device 12 does not use the configured TRS(s) for time/frequency tracking, for reception of the data transmission. Note that in some scenarios, spatial information gleaned from a configured TRS may still be relevant for receiving the data transmission and the wireless communication device 12 may use such information for reception beamforming, while still avoiding/prohibiting use of any other QCL information from the configured TRS for reception of the data.

Figure 4:
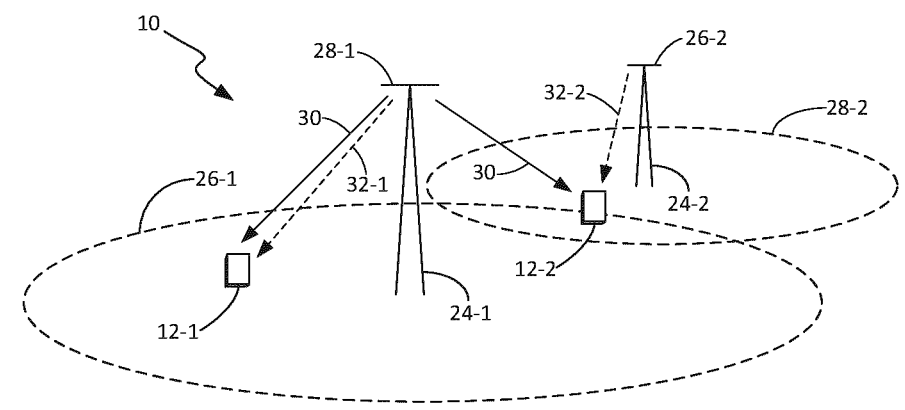
FIG. 4 is a block diagram of example details for the network of FIG. 3.

FIG. 4 illustrates an example scenario, depicting two TPs 24-1 and 24-2 for the network 10. Each TP 24 providing radio coverage in a respective coverage area 26—e.g., the TP 24-1 provides radio coverage over the coverage area 26-1 and the TP 24-2 provides radio coverage over the coverage area 26-2. The coverage areas 26 may be referred to as "cells" and generally represent the use of specific radio resources (e.g., times, frequencies, etc.) to provide radio coverage over a specific physical area, but antenna systems 28 of the respective TPs 24 may be beamforming arrays and the coverage areas 26 may be divided or otherwise formed as beams and may be dynamically formed or selected and may change from transmission instant to instant.

The TP 24-1 transmits a TRS 30, e.g., a CSI-RS on a periodic basis. Given its relative position to the TP 24-1, a wireless communication device 12-1 is best served by the TP 24-1, e.g., for the transmission of a physical downlink channel 32-1, e.g., a PDSCH transmission. As such, there is a valid QCL relationship between the TRS 30 and the physical downlink channel 32-1 and the wireless communication device 12-1 is not prohibited from using the TRS 30 for time or frequency tracking, for reception of the physical downlink channel 32-1. More generally, the wireless communication device 12-1 may use the TRS 30 for any of QCL Type A, B, C, and D relationships between the TRS 30 and the physical downlink channel 32-1.

However, the wireless device 12-2 resides at a cell-edge or overlapped coverage area and, for example purposes, the TP 24-2 provides a better radio link for the transmission of a physical downlink channel 32-2. Consequently, the TRS 30 does not have a valid QCL relationship with the physical downlink channel 32-2, and the wireless device 12-2 is prohibited from using the TRS 30 and any other configured TRS associated with the TP 24-1, for time/frequency tracking for reception of the physical downlink channel 32-2. Of course, channel conditions change and there may be other instances or transmissions for which the wireless device 12-2 is not prohibited from using the TRS 30.

Figure 5:
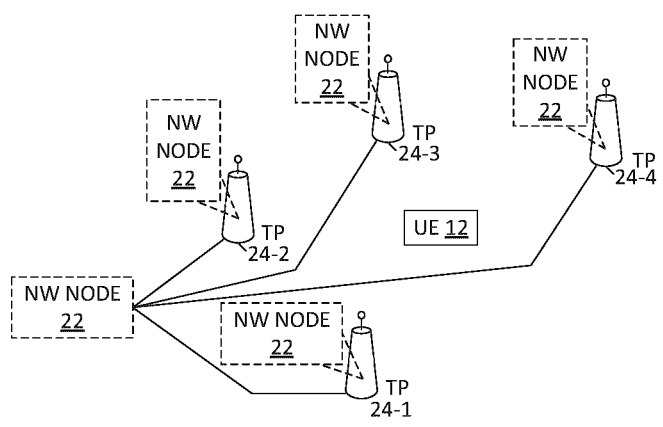
FIG. 5 is a block diagram of further example details for the network of FIG. 3.

FIG. 5 illustrates that the RAN 20 of the network 10 may include multiple TPs 24, e.g., TP 24-1, 24-2, 24-3, and 24-4. FIG. 3 also illustrates that there may be a one-to-one relationship between radio network nodes 22 and TPs 24, i.e., each radio network node 22 operates as a TP 24, or there may be a many-to-one relationship, wherein a given radio network node 22 controls or otherwise uses more than one TP 24.

Figure 6:
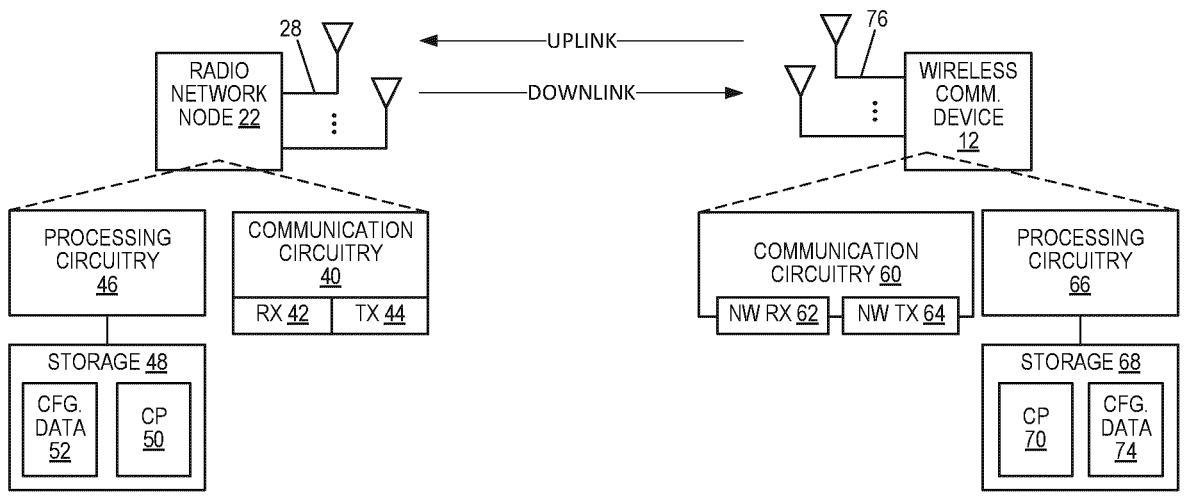
FIG. 6 is a block diagram of example embodiments of a network node and a wireless communication device, interchangeably referred to as a User Equipment or UE.

FIG. 6 illustrates an example embodiment of a radio network node 22, such as a gNB in a 5G NR embodiment of the network 10. Here, the radio network node 22 incorporates or is otherwise coupled to an antenna system 28 and functions as a TP 24, with respect to providing an air interface for communicating with wireless communication devices 12 and performing downlink transmissions.

The example radio network node 22 includes communication circuitry 40, which includes receiver (RX) circuitry 42 and transmitter (TX) circuitry 44. The communication circuitry 40 comprises, for example radiofrequency circuitry configured for the transmission of downlink signals to wireless communication devices 12, and the reception of uplink signals from such devices.

Processing circuitry 46 of the radio network node 22 is operatively associated with the communication circuitry 40, meaning, for example, the processing circuitry 46 sends and receives control signaling or data via the communication circuitry 40. The communication circuitry 40 may also include one or more other types of communication circuit interfaces, such as internode communication interfaces that communicatively couple the radio network node 22 two one or more other nodes of the same or different types within the network 10.

The processing circuitry 46 comprises, for example, one or more microprocessors, digital signal processors, FPGAs, ASICs, or other forms of digital processing circuitry. In at least one embodiment, the functional configuration of the processing circuitry 46 is realized via the execution of computer program instructions. For example, the processing circuitry 46 incorporates or is associated with storage 48, which stores one or more computer programs 50 comprising such program instructions. The storage 48 also may store configuration data 52, associated with operation of the radio network node 22 as described herein.

The storage 48 comprises one or more types of computer-readable media providing volatile or nonvolatile storage of the computer program(s) 50 and/or configuration data 52. As an example, the storage 48 comprises any one or any mix of SRAM, DRAM, NV RAM, FLASH memory, EEPROM, solid-state disk, or other memory device or circuit.

In at least one embodiment, the radio network node 22 can be understood as a network node that is configured for operation in a wireless communication network, e.g., in the network 10. Accordingly, an example network node comprises processing circuitry 46 that is configured to transmit signaling to a User Equipment (UE) via communication circuitry 40, where the signaling indicates that all configured TRSs are prohibited from use by the UE for time or frequency tracking, for reception of a physical downlink channel transmitted by a TP 24 of the wireless communication network 10.

For example, the processing circuitry 46 is configured to transmit the signaling as a Radio Resource Control (RRC) message or MAC message to the UE. Transmitting the signaling comprises, for example, indicating a Transmission Configuration Information (TCI) state which does not contain a source reference signal associated with any of Quasi Co-Location (QCL) Type A, B or C to the UE.

In a particular example, the processing circuitry 46 is configured to transmit the signaling to the UE by transmitting Downlink Control Information (DCI) for the UE. The DCI schedules a Physical Downlink Shared Channel (PDSCH) for the UE as the physical downlink channel and includes a PDSCH-to-HARQ timing that is above a defined timing threshold, wherein HARQ denotes Hybrid Automatic Repeat reQuest. In at least one such embodiment, the processing circuitry 46 is configured to indicate the defined timing threshold to the UE via a Radio Resource Control (RRC) message or MAC message.

In another example of transmitting signaling to a UE indicating that TRS use by the UE is prohibited for time/frequency tracking with respect to reception of a physical downlink channel to be transmitted, the processing circuitry 46 is configured to transmit information defining a condition, the satisfaction of which prohibits use by the UE of all configured TRSs for time or frequency tracking for reception of the physical downlink channel. The physical downlink channel is a scheduled physical downlink channel, for example, where the defined condition is any one or more of (a) a defined bandwidth threshold, a threshold on the number of scheduled resource blocks allocated for the physical downlink channel, usage of an MCS for which TRS use is prohibited, or usage of a particular Radio Network Temporary Identifier (RNTI) for which TRS use is prohibited. Correspondingly, the UE prohibits use of any configured TRS for time or frequency tracking for reception of the physical downlink channel in question, in response to satisfaction of any of the one or more defined criteria. However, the UE also may be configured not to prohibit use of all configured TRS(s) if the physical downlink channel in question has an insufficient number of DMRS transmissions included within it.

In at least one embodiment, the processing circuitry 46 is configured to not transmit or not initiate the transmission of a new or reconfigured TRS for the physical downlink channel. That is, in an instance where use of all configured TRS(s) by a UE is prohibited with respect to receiving one or more physical downlink channel transmissions, the radio network node 22 need not transmit or initiate the transmission of a TRS by any of the TPs 24 that are involved in the transmissions.

For example, if the TP 24 to be used for performing a physical downlink channel transmission to the UE is not the TP 24 that is associated with the configured TRS(s), the processing circuitry 46 is configured to determine that the use by the UE of the configured TRS(s) is prohibited, with respect to time/frequency tracking by the UE for reception of the physical downlink channel.

FIG. 7 illustrates a method 500 according to one embodiment, wherein the method is performed by a network node in a wireless communication network, such as a radio network node 22. The method 500 includes transmitting (Block 504) signaling to a User Equipment (UE) indicating that all configured Tracking Reference Signal (TRSs) are prohibited from use by the UE for time or frequency tracking, for reception of a physical downlink channel transmitted by a transmission point (TP) of the wireless communication network.

Step 504 may be preceded in some embodiments or in some operational scenarios by the step of determining (Block 502) that the configured TRS(s) shall not be used by the user equipment for the time or frequency tracking, for reception of the physical downlink channel in question. For example, the network node determines that the physical downlink channel will be transmitted from a TP 24 that is not associated with the configured TRS(s).

FIG. 8 illustrates another embodiment of a network node, such as a radio network node 22. The illustrated node comprises a set 600 of one or more processing modules or processing units, such as may be realized via the execution of computer program instructions in one or more microprocessors.

The set 600 includes a transmitting module 604 that is configured to transmit signaling to a User Equipment (UE) indicating that all configured Tracking Reference Signal (TRSs) are prohibited from use by the UE for time or frequency tracking, for reception of a physical downlink channel transmitted by a transmission point (TP) of the wireless communication network. The set 600 may further include a determining module 602 that is configured to determine that the configured TRS(s) shall not be used by the user equipment for the time or frequency tracking, for reception of the physical downlink channel in question. The determination also may be made with respect to a particular interval or a particular number of transmissions or for so long as a particular condition or conditions prevail.

Turning back to FIG. 6, an example wireless communication device 12 (also referred to as a UE) includes communication circuitry 60, which includes receiver (RX) circuitry 62 and transmitter (TX) circuitry 64. The communication circuitry 60 comprises, for example radiofrequency circuitry configured for the reception of downlink signals and the transmission of uplink signals. The communication circuitry 60 also may include local area networking communication interfaces, such as Wi-Fi, and may include Bluetooth interfaces, and one or more near field communication radio interfaces.

Processing circuitry 66 of the wireless communication device 12 is operatively associated with the communication circuitry 60, meaning, for example, the processing circuitry 66 sends and receives control signaling or data via the communication circuitry 60.

The processing circuitry 66 comprises, for example, one or more microprocessors, digital signal processors, FPGAs, ASICs, or other forms of digital processing circuitry. In at least one embodiment, the functional configuration of the processing circuitry 66 is realized via the execution of computer program instructions. For example, the processing circuitry 66 incorporates or is associated with storage 68, which stores one or more computer programs 70 comprising such program instructions. The storage 68 also may store configuration data 72, associated with operation of the wireless communication device 12 as described herein.

The storage 68 comprises one or more types of computer-readable media providing volatile or nonvolatile storage of the computer program(s) 70 and/or configuration data 72. As an example, the storage 68 comprises any one or any mix of SRAM, DRAM, NV RAM, FLASH memory, EEPROM, solid-state disk, or other memory device or circuit.

In an example embodiment, the processing circuitry 66 is configured not to use a configured TRS for time or frequency tracking, for reception of one or more transmissions by a wireless communication network, responsive to determining that such use is prohibited with respect to the one or more transmissions.

In more detail, in at least one embodiment, the processing circuitry 66 is configured to determine that all configured TRSs are prohibited from use by the wireless communication device 12 for time or frequency tracking, for reception of a physical downlink channel transmitted by a TP 24 of a wireless communication network 10. Responsive to the determining, the processing circuitry 66 is configured to control the wireless communication device 10 to perform time or frequency tracking for reception of the downlink physical channel using Demodulation Reference Symbols (DMRS) transmitted for the physical downlink channel.

In at least one example, the processing circuitry 66 determines that all configured TRSs are prohibited based on the wireless communication device 12 receiving signaling from a network node of the wireless communication network 10, where the signaling indicates the prohibition. For example, the signaling comprises an RRC message or a MAC message.

As a further example, the signaling is conveyed by a physical downlink control channel (PDCCH) scheduling a Physical Downlink Shared Channel (PDSCH). The PDCCH carries a Transmission Configuration Information (TCI) state which does not contain a source reference signal associated with any of Quasi Co-Located (QCL) Type A, B or C. Correspondingly, the processing circuitry 66 is configured to interpret the TCI state as a prohibition from using any configured TRS for the time or frequency tracking.

The physical downlink channel at issue is a PDSCH example and the signaling comprises an indicated PDSCH-to-HARQ timing in Downlink Control Information (DCI) scheduling the PDSCH. Here, HARQ denotes Hybrid Automatic Repeat reQuest, and the processing circuitry 66 determines that the configured TRS(s) are prohibited by determining that the indicated PDSCH-to-HARQ timing exceeds a defined timing threshold. The defined timing threshold is received for example via an RRC message or a MAC message, as transmitted by a radio network node 22 of the network 10.

As a further example, the processing circuitry 66 is configured to determine that use of the configured TRS(s) is/are prohibited, based on determining that a defined condition is satisfied, wherein satisfaction of the defined condition means that use of the configured TRS(s) is/are prohibited. The condition may be satisfaction of one or more criteria.

For example, the physical downlink channel at issue is a scheduled physical downlink channel and the processing circuitry 66 determines that the defined condition is satisfied by any one or more of: determining that a bandwidth of the scheduled physical downlink channel exceeds a defined bandwidth threshold, determining that the number of scheduled resource blocks of the scheduled physical downlink channel exceeds a defined threshold, determining that a Modulation and Coding Scheme (MCS) of the scheduled physical downlink channel is one for which use of any configured TRS is prohibited, or determining that a Radio Network Temporary Identifier (RNTI) associated with the physical downlink channel is one for which use of any configured TRS is prohibited.

Regardless of the particular criterion or number of criteria considered by the processing circuitry 66, in at least one embodiment, the processing circuitry 66 determines that the defined condition is not satisfied if the scheduled physical downlink channel has a single OFDM symbol used for DMRS.

Although the processing circuitry 66 may consider the use of the configured TRS(s) as being prohibited, the prohibition may be applied to time/frequency tracking and/or use of the configured TRS(s) for estimating statistical channel properties, the processing circuitry 66 may still use the configured TRS(s) for spatial purposes. For example, the processing circuitry 66 may configure reception beamforming for reception of the physical downlink channel, based on a reception beamforming configuration determined for a configured TRS.

Still further, although the processing circuitry 66 considers the configured TRS(s) as being prohibited from use with respect to receiving a particular physical downlink channel (or for reception with respect to a particular interval or a particular TP 24 or while a particular condition or conditions are prevailing), the processing circuitry 66 in one or more embodiments is configured to use a configured TRS for receiving another physical downlink channel, e.g., one transmitted at a later time, or transmitted by a different TP 24, or transmitted under other conditions. The configured TRS is, for example, a Channel State Information (CSI) Reference Signal (RS) that is periodically transmitted by a TP 24 and configured for time or frequency tracking use by the UE.

In an example configuration, the wireless communication device 12 can be configured with multiple (up to 64 in total, but at most 8 active) TRS simultaneously and the wireless communication device 12 applies the prohibition to all/any configured TRS in at least some embodiments.

FIG. 9 illustrates one embodiment of a method 700 performed by a wireless communication device 12, where the method 700 includes determining (Block 702) that all configured TRSs are prohibited from use for time or frequency tracking, for reception by the wireless communication device of a physical downlink channel. The method 700 further includes the wireless communication device 12, in response to the determination, performing (Block 704) time or frequency tracking for reception of the physical downlink channel using DMRS transmitting for the physical downlink channel, e.g., conveyed using allocated RBs within the overall set of RBs allocated for the physical downlink channel.

In at least one embodiment herein, a wireless communication device 12, also referred to as a UE, performs a method comprising not using a configured Tracking Reference Signal (TRS) for time or frequency tracking, for reception of one or more transmissions by a wireless communication network 10, responsive to determining that such use is prohibited with respect to the one or more transmissions.

FIG. 10 illustrates another example embodiment of a wireless communication device 12 comprising a set of one or more processing modules or units, such as may be realized functionally via the execution of stored computer program instructions by one or more microprocessors or other digital processing circuitry.

The set 800 includes a determining module 802 that is configured to determine that all configured TRSs are prohibited from use for time or frequency tracking, for reception by the wireless communication device of a physical downlink channel. The set 800 further includes a performing module 804 that is configured to respond to the determination by performing time or frequency tracking for reception of the physical downlink channel using DMRS transmitting for the physical downlink channel—i.e., not using any of the configured TRS(s) because of the prohibition.

Embodiments herein also include corresponding apparatuses. Embodiments herein for instance include a wireless device configured to perform any of the steps of any of the embodiments described above for a wireless device.

Embodiments also include a wireless device comprising processing circuitry and power supply circuitry. The processing circuitry is configured to perform any of the steps of any of the embodiments described above for the wireless device. The power supply circuitry is configured to supply power to the wireless device.

Embodiments further include a wireless device comprising processing circuitry. The processing circuitry is configured to perform any of the steps of any of the embodiments described above for the wireless device. In some embodiments, the wireless device further comprises communication circuitry.

Embodiments further include a wireless device comprising processing circuitry and memory. The memory contains instructions executable by the processing circuitry whereby the wireless device is configured to perform any of the steps of any of the embodiments described above for the wireless device.

Embodiments moreover include a user equipment (UE). The UE comprises an antenna configured to send and receive wireless signals. The UE also comprises radio front-end circuitry connected to the antenna and to processing circuitry and configured to condition signals communicated between the antenna and the processing circuitry. The processing circuitry is configured to perform any of the steps of any of the embodiments described above for the wireless device. In some embodiments, the UE also comprises an input interface connected to the processing circuitry and configured to allow input of information into the UE to be processed by the processing circuitry. The UE may comprise an output interface connected to the processing circuitry and configured to output information from the UE that has been processed by the processing circuitry. The UE may also comprise a battery connected to the processing circuitry and configured to supply power to the UE.

Embodiments herein also include a radio network node configured to perform any of the steps of any of the embodiments described above for the radio network node.

Embodiments also include a radio network node comprising processing circuitry and power supply circuitry. The processing circuitry is configured to perform any of the steps of any of the embodiments described above for the radio network node. The power supply circuitry is configured to supply power to the radio network node.

Embodiments further include a radio network node comprising processing circuitry. The processing circuitry is configured to perform any of the steps of any of the embodiments described above for the radio network node. In some embodiments, the radio network node further comprises communication circuitry.

Embodiments further include a radio network node comprising processing circuitry and memory. The memory contains instructions executable by the processing circuitry whereby the radio network node is configured to perform any of the steps of any of the embodiments described above for the radio network node.

More particularly, the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Broadly, it is recognized herein that for large MCS (i.e., higher order modulation), as typically used in high SINR cases, the use of periodic TRS measurements to assist UE demodulation of PDSCH does not provide any additional benefit for PDSCH demodulation. Further, for large scheduling bandwidths, there is no additional benefit of using periodic TRS measurements. In these or other scenarios, a wireless communication network and a wireless communication device have complementary configurations whereby, at certain times, or under certain conditions, or for certain transmissions, the network prohibits the device from using any configured TRS for time or frequency tracking for the reception of a signal transmitted by the network for the device. For example, in at least one embodiment, the network enables or disables the use of a source reference signal that is QCL with the PDSCH DMRS targeting a particular device, depending on criteria and/or signaling from the network to the particular UE.

However, there are cases when the periodic TRS is needed for demodulation so periodic TRS and TCI states may still be configured for the UE and used by the UE. One aspect of the disclosed technique is to distinguish whether TRS usage is prohibited (enabled vs disabled) at any given time or with respect to any given transmission, and such must be known and agreed between the network and the UE.

An example UE has one or more TCI states configured (by RRC) and activated (by a MAC Control Element (CE) for example) that indicates periodic source RS(s) (TRS) that may be selected as QCL with the scheduled PDSCH DMRS. The UE receives a DCI from the network (NW) for scheduling a PDSCH and one TCI state is assigned to be valid for the PDSCH DMRS. If TRS use is prohibited for the PDSCH—i.e., self-contained demodulation is enabled— then the UE shall not use at least some of the information in the assigned and activated TCI state.

Conversely, if the UE is not prohibited from using a TRS with respect to receiving a particular transmission, the UE may use the TRS, or it may not use it, depending on the circumstances or the UE implementation.

If a periodic source RS (TRS or SSB) in TCI shall not be used, the UE shall not use the periodic source RS for assisting the reception of PDSCH.

In a further embodiment, it is noted that a TCI state may have two QCL types configured. If TRS use is prohibited, the UE at least shall not use the source RS corresponding to any of QCL Type A, B, or C. The UE may still use the QCL Type D in the indicated TCI state, if applicable, in order to adjust the RX beam (e.g., if operating in FR2).

When TRS use is prohibited and the UE does not use any of the QCL Type A, B, or C information for reception of a physical downlink channel, the UE may perform synchronization using DMRS transmitted in/with the physical downlink channel. Again, such operations may be referred to as "self-contained" demodulation.

Eventually, the UE may also perform synchronization using an SSB, as a matter of UE implementation. Hence, even if the UE is not allowed to use a TRS for synchronization, it may still be allowed to use the SSB that is in turn QCL linked to the TRS that was disabled. Hence, in at least one embodiment, a UE is configured to use an SSB for coarse synchronization but does not use the QCL-linked TRS for fine tuning of the synchronization.

For example, a UE is configured with a TCI state containing a TRS. When demodulating a PDSCH, the DMRS is QCL Type A with the TRS in the TCI state. That TRS is in turn QCL Type C linked to another TCI state involving an SSB. When the first TCI state containing the TRS is disabled, the UE can still use the SSB of the second TCI state for measurements to assist reception of the PDSCH, but only using QCL Type C parameters. Such operations may be understood as the prohibition against TRS use being a form of "limited" or "qualified" prohibition.

The network and the involved UE may treat TRS use as prohibited if any one or more of the following conditions are satisfied:

If the total scheduled PDSCH bandwidth as indicated by the DCI is larger than a threshold value B, then the UE shall not use the TCI state;

The value B can be fixed in specifications, e.g., B=6 resource blocks, or the value of B is configured by higher layers;

If the MCS as indicated by the DCI is larger than a threshold value M, then the UE shall not use the TCI state;

The value M can be fixed in specifications or the value of M is configured by higher layers;

If the radio network temporary identifier (RNTI) of the scheduled PDSCH is the C-RNTI, then the UE shall not use the configured/indicated TCI state for the PDSCH reception-conversely, if the RNTI of the scheduled PDSCH is P-RNTI, RA-RNTI, SI-RNTI, i.e., if the PDSCH contains system information, initial access messages, control signaling, then the UE may use the TCI state for the PDSCH reception;

If the PDCCH that schedules the PDSCH at issue is received in a UE-specific search space, then the UE shall not use the TCI state, otherwise it may use the TCI state for the PDSCH reception;

If the PDCCH that schedules the PDSCH at issue is received in a specific CORESET which has been configured by higher layers to support self-contained demodulation, then the UE shall not use the TCI state for the PDSCH reception, otherwise, the UE may use the TCI state for the PDSCH reception—for CORESET #0, the UE may always use the configured TCI state for the PDSCH reception.

Another embodiment involves configuring and using "empty" TCI states. Configuring an empty TCI state may rely on higher-layer signaling between the network and the UE. If the indicated TCI state for receiving a PDSCH is empty, then UE shall not use a source RS for QCL when receiving the PDSCH and, hence, perform a "self-contained" demodulation. In another embodiment, a TCI code point which is not mapped to any activated TCI state, or is mapped to an "empty" TCI state, may be used to indicate that no source RS is to be used—i.e., to indicate that no configured TRS may be used by the UE for PDSCH reception (other than, for example, QCL Type D information related to beamforming). Correspondingly, in yet another embodiment, the indicated TCI state for PDSCH reception may only contain a source RS for QCL Type D which is used for adjusting the RX beam (e.g., in FR2), and does not contain a source RS for QCL Types A, B, or C.

In another embodiment used to disable a TRS source that is QCL with PDSCH DMRS, the TCI state used/signaled/configured for PDSCH reception contains an SSB and not a TRS. This configuration is understood by the involved network node and the UE that the UE is only allowed to use QCL Type C parameters for synchronization, based on the SSB, hence the UE must perform the fine tuning of synchronization based on self-contained principles, such as using the PDSCH DMRS. The network can then switch between an SSB and a TRS as the QCL source for PDSCH reception, to switch between legacy NR operation and the flexible operation described herein. The switch can be enabled by indicating the TCI state in the DCI when scheduling the PDSCH.

If a dedicated information element in the DCI is configured by higher layer, it is used to indicate that the TCI state shall not be used/may be used. Hence, the existing DCI format may be extended with a "flag" which indicates to the UE how to interpret the TCI state signaled in the same DCI.

In at least one embodiment, a UE is configured to report whether it supports TRS prohibition as a UE capability parameter, where the capability may be reported on per (frequency) band basis.

As a further example criterion, if a scheduled PDSCH is configured or dynamically indicated in DCI as using a particular PRG (precoding resource block group) size (e.g., 4 or wideband), then the UE shall not use the TCI state—i.e., TRS use is prohibited for the PDSCH reception. Hence, some PRG sizes may be used to indicate implicitly to a UE that the TCI state shall not be used, while some other PRG sizes are used to indicate implicitly to the UE that the UE may use the TCI state.

For self-contained PDSCH demodulation, the UE performs time/frequency synchronization on PDSCH DMRS, for example. Doing so increases the PDSCH processing time at the UE as compared to the case in existing NR specification where the UE uses TRS for time/frequency synchronization prior to receiving the PDSCH. Hence, in one embodiment, a threshold on PDSCH-to-HARQ timing is introduced which defines when the UE may perform self-contained PDSCH demodulation. The threshold may be indicated to the UE via higher layer configuration or predefined in specifications. In addition, the threshold may also depend on UE capability reporting where the UE indicates to the network the threshold value supported by the UE.

In one example embodiment, if the PDSCH-to-HARQ timing indicated in DCI is larger than or equal to the threshold, then the UE will perform self-contained PDSCH demodulation. If the PDSCH-to-HARQ timing indicated in DCI is smaller than the threshold, the UE may use the source RS in a default TCI state or the TCI state indicated in DCI, for time-frequency synchronization, which is done prior to PDSCH demodulation.

In another example embodiment, if the PDSCH-to-HARQ timing is higher layer configured (i.e., not indicated in DCI), then the UE will perform self-contained PDSCH demodulation when the PDSCH-to-HARQ timing is higher than the threshold. If the higher-layer configured PDSCH-to-HARQ timing is smaller than the threshold, the UE may use the source RS in a default TCI state or the TCI state indicated in DCI, which will be used for time-frequency synchronization prior to PDSCH demodulation.

Further, the "self-contained" PDSCH demodulation operations may be extended to the case where the UE receives PDSCH(s) from multiple TPs in the network. When the UE receives M PDSCH layers from a single TP, then in the case of self-contained demodulation of the PDSCH, one of the PDSCH DMRS ports is used for time/frequency synchronization. In one embodiment, the PDSCH DMRS port with the lowest port index as indicated to the UE can be used for time-frequency synchronization during self-contained PDSCH demodulation. In an alternative embodiment, the PDSCH DMRS port to be used for time-frequency synchronization during self-contained PDSCH demodulation is preconfigured to the UE via higher layer configuration or predefined in 3GPP specifications.

When the UE receives M PDSCH layers from two different TPs, then in the case of self-contained demodulation of the PDSCH, the PDSCH DMRS ports may be grouped into two or more groups, where each group of PDSCH DMRS ports corresponds to a different TP. Then, the PDSCH DMRS port with the lowest port index in each group of PDSCH DMRS ports indicated to the UE can be used for time-frequency synchronization of the associated TP during self-contained demodulation of the PDSCH. The groups of PDSCH DMRS ports may be preconfigured to the UE via higher layer configuration or predefined in the applicable specifications.

In some cases, multiple PDSCHs may be repeated (e.g., using different redundancy versions of the same transport block) from one or multiple TPs. For instance, four PDSCHs may be scheduled from two TPs, where the PDSCHs 1 and 2 are transmitted from a first TP (TP 1) and PDSCHs 3 and 4 are transmitted from a second TP (TR 2). In some embodiments, the UE only performs time/frequency synchronization from only a PDSCH DMRS port corresponding to the first PDSCH transmission occasion from each TP. In such an example, time-frequency synchronization is performed by the UE for TP1 using a PDSCH DMRS port corresponding to PDSCH 1, and time-frequency synchronization is performed by the UE for TR2 using a PDSCH DMRS port corresponding to PDSCH 3.

Differentiation between whether PDSCH(s) is/are scheduled from a single TP or multiple TPs is based on the number of TCI states indicated in DCI transmitted to the UE. For instance, if one TCI state is indicated in the DCI scheduling a PDSCH for the UE, then the PDSCH transmission is from a single TP. If two TCI states are indicated in the DCI, then the PDSCH transmission is from two TPs. However, the source RSs—i.e., the configured TRS—in the indicated TCI states are not used by the UE for time-frequency synchronization. Each involved TP is represented by a TCI state. As an aside, the term "TP" may not be used in the applicable 3GPP specifications or other documents, and it shall be understood as referring to the involved transmitters.

All terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The term "A and/or B" as used herein covers embodiments having A alone, B alone, or both A and B together. The term "A and/or B" may therefore equivalently mean "at least one of any one or more of A and B".

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

What is claimed is:

1. A method performed by a User Equipment (UE), the method comprising:
determining that all configured Tracking Reference Signals (TRSs) are prohibited from use by the UE for time or frequency tracking, for reception of a physical downlink channel transmitted by a transmission point (TP) of a wireless communication network; and
responsive to the determining, performing time or frequency tracking for reception of the physical downlink channel using Demodulation Reference Symbols (DMRS) transmitted for the physical downlink channel.

2. The method of claim 1, wherein determining that all configured TRSs are prohibited comprises receiving signaling from a network node of the wireless communication network, the signaling indicating the prohibition.

3. The method of claim 2, wherein the signaling comprises a Radio Resource Control (RRC) message or a Medium Access Control (MAC) message.

4. The method of claim 2, wherein the signaling is conveyed by a physical downlink control channel (PDCCH) scheduling a Physical Downlink Shared Channel (PDSCH), wherein the PDCCH carries a Transmission Configuration Information (TCI) state which does not contain a source reference signal associated with any of Quasi Co-Located (QCL) Type A, B or C, and wherein the method includes the UE interpreting the TCI state as a prohibition from using any configured TRS for the time or frequency tracking.

5. The method of claim 2, wherein the physical downlink channel is a Physical Downlink Shared Channel (PDSCH) and wherein the signaling comprises an indicated PDSCH-to-HARQ timing in Downlink Control Information (DCI) scheduling the PDSCH, wherein HARQ denotes Hybrid Automatic Repeat reQuest, and wherein determining that all configured TRS are prohibited comprises determining that the indicated PDSCH-to-HARQ timing exceeds a defined timing threshold.

6. The method of claim 5, wherein the defined timing threshold is received via a Radio Resource Control (RRC) message or a Medium Access Control (MAC) message from a network node of the wireless communication network.

7. The method of claim 1, wherein determining that all configured TRSs are prohibited comprises determining that a defined condition for prohibition is satisfied.

8. The method of claim 7, wherein the physical downlink channel is a scheduled physical downlink channel and wherein determining that the defined condition is satisfied comprises any one or more of determining that a bandwidth of the scheduled physical downlink channel exceeds a defined bandwidth threshold, determining that the number of scheduled resource blocks of the scheduled physical downlink channel exceeds a defined threshold, determining that a Modulation and Coding Scheme (MCS) of the scheduled physical downlink channel is one for which use of all configured TRSs are prohibited, or determining that a Radio Network Temporary Identifier (RNTI) associated with the scheduled physical downlink channel is one for which use of all configured TRSs is prohibited.

9. The method of claim 7, wherein the defined condition is not satisfied if the scheduled PDSCH has a single OFDM symbol used for DMRS.

10. The method of claim 1, further comprising using spatial characteristics determined for a configured TRS, for reception of the physical downlink channel.

11. The method of claim 1, further comprising further determining that a configured TRS associated with a further physical downlink channel is not prohibited from use by the UE for time or frequency tracking, for reception of the further physical downlink channel transmitted by the TP or by another TP of the wireless communication network, and, responsive to the further determining, performing time or frequency tracking for reception of the further physical downlink channel using the configured TRS associated with the further physical downlink channel.

12. A User Equipment (UE) comprising:
communication circuitry configured for wireless communication with respect to a wireless communication network; and
processing circuitry operatively associated with the communication circuitry and configured to:
determine that all configured Tracking Reference Signals (TRSs) are prohibited from use by the UE for time or frequency tracking, for reception of a physical downlink channel transmitted by a transmission point (TP) of a wireless communication network; and responsive to the determining, perform time or frequency tracking for reception of the physical downlink channel using Demodulation Reference Symbols (DMRS) transmitted for the physical downlink channel.

13. A method performed by a network node in a wireless communication network, the method comprising transmitting signaling to a User Equipment (UE) indicating that all configured Tracking Reference Signals (TRSs) are prohibited from use by the UE for time or frequency tracking, for reception of a physical downlink channel transmitted by a transmission point (TP) of the wireless communication network.

14. The method of claim 13, wherein transmitting the signaling to the UE comprises transmitting a Radio Resource Control (RRC) message or MAC message to the UE.

15. The method of claim 13, wherein transmitting the signaling comprises indicating a Transmission Configuration Information (TCI) state which does not contain a source reference signal associated with any of Quasi Co-Location (QCL) Type A, B or C to the UE.

16. The method of claim 13, wherein transmitting the signaling to the UE comprises transmitting Downlink Control Information (DCI) for the UE, the DCI scheduling a Physical Downlink Shared Channel (PDSCH) for the UE as the physical downlink channel, the DCI including a PDSCH-to-HARQ timing that is above a defined timing threshold, wherein HARQ denotes Hybrid Automatic Repeat reQuest.

17. The method of claim 16, wherein the defined timing threshold is transmitted to the UE via a Radio Resource Control (RRC) message or MAC message.

18. The method of claim 13, wherein transmitting the signaling comprises transmitting information defining a condition, the satisfaction of which prohibits use by the UE of all configured TRSs for time or frequency tracking for reception of the physical downlink channel.

19. The method of claim 18, wherein the physical downlink channel is a scheduled physical downlink channel and wherein the defined condition is a defined bandwidth threshold or a threshold on the number of scheduled resource blocks or usage of one or more defined Modulation and Coding Schemes (MCSs) or usage of a particular Radio Network Temporary Identifier (RNTI), such that the UE prohibits use of any configured TRS for time or frequency tracking for reception of the physical downlink channel in response to a bandwidth or number of scheduled resource blocks of the scheduled physical downlink channel exceeding the defined bandwidth threshold or an MCS of the scheduled physical downlink channel being one of the one or more defined MCSs or an RNTI used for the scheduled physical downlink channel being the particular RNTI.

20. The method of any of claim 13, wherein the TP is a selected one among two or more TPs that are candidates for use in transmitting the physical downlink channel to the UE, and wherein the method further comprises determining that use of all configured TRSs is prohibited responsive to the selected TP not being the TP used for transmitting any of the configured TRSs.

* * * * *